United States Patent [19]
Line

[11] Patent Number: 6,068,431
[45] Date of Patent: May 30, 2000

[54] MACHINE TOOL HAVING A GANTRY AND A VERTICAL SPINDLE

[75] Inventor: Henri Line, Peymeinade, France

[73] Assignee: Helis S.A., France

[21] Appl. No.: 08/987,826

[22] Filed: Dec. 9, 1997

[30] Foreign Application Priority Data

Dec. 9, 1996 [FR] France .................................. 96 15078

[51] Int. Cl.[7] .................................................. B23C 1/00
[52] U.S. Cl. .............................. 409/202; 29/822; 144/2.1
[58] Field of Search .................................. 409/202, 235, 409/153; 29/771, 791, 822; 144/2.1, 139.2, 139.3

[56] References Cited

U.S. PATENT DOCUMENTS

| | | | |
|---|---|---|---|
| 3,780,619 | 12/1973 | Kitamura | 409/202 |
| 4,621,407 | 11/1986 | Suzuki | 409/235 |
| 4,632,615 | 12/1986 | Yamamura | 409/235 |
| 4,637,761 | 1/1987 | Murray . | |
| 5,152,645 | 10/1992 | Corsi | 409/235 |
| 5,340,247 | 8/1994 | Cuneo et al. | 409/202 |
| 5,350,262 | 9/1994 | Michaelis . | |
| 5,375,952 | 12/1994 | Line | 408/235 |
| 5,575,318 | 11/1996 | Sasnjara | 409/235 |
| 5,678,291 | 10/1997 | Braun | 409/202 |
| 5,688,084 | 11/1997 | Fritz et al. | 409/202 |

FOREIGN PATENT DOCUMENTS

| | | |
|---|---|---|
| 0614724 | 9/1994 | European Pat. Off. . |
| 2715336 | 7/1995 | France . |
| 58-56716 | 4/1983 | Japan ..................................... 409/202 |

*Primary Examiner*—Andrea L. Pitts
*Assistant Examiner*—Adesh Bhargava
*Attorney, Agent, or Firm*—Ostrolenk, Faber, Gerb & Soffen, LLP

[57] ABSTRACT

The invention relates to a machine tool having a gantry that is movable along an X axis and having a vertical spindle supported by the cross-member of the gantry. The cross-member comprises two beams that are spaced apart in the X axis direction and that have facing inside faces. Two carriages are mounted to slide on said facing faces, on opposite sides of a vertically movable cursor-carrier. The tool-carrier spindle is carried by a cursor mounted to slide on the bottom face of the cursor-carrier and movable along the X axis. Movements of the carriages, of the cursor-carrier and of cursor are under numerical control. The tool-carrier spindle can move in the X axis direction without it being necessary to move the gantry.

2 Claims, 1 Drawing Sheet

6,068,431

MACHINE TOOL HAVING A GANTRY AND A VERTICAL SPINDLE

FIELD OF THE INVENTION

The present invention relates to large capacity machine tools and in particular to milling machines having vertical spindles and moving gantries.

More precisely, the invention relates to a machine tool comprising a rigid bench, a gantry having two uprights interconnected by a top cross-member having two faces spaced apart in the direction of an X axis, means for moving the gantry on said bench along the X axis, two carriages disposed respectively on said spaced-apart faces of the cross-member and movable along a transverse Y axis, a cursor-carrier supported by said carriages and movable along a vertical Z axis, a cursor mounted on said cursor-carrier and movable along the X axis, a tool-carrier spindle carried by said cursor and capable of rotating about the Z axis, and a numerical control system for controlling synchronized movements of the two carriages along the Y axis, movement of said cursor-carrier along the Z axis, and movement of said cursor relative to said cursor-carrier along the X axis, thereby enabling machining to be performed quickly and accurately in a limited three-dimensional zone without moving the gantry.

BACKGROUND OF THE INVENTION

Such a machine tool is described in FR-A-2 715 336, of which the Applicant is proprietor.

In that document, the carriages are disposed on opposite faces of the cross-member and the section of the cursor-carrier in a plane perpendicular to the Y axis is U-shaped defined by two parallel flanges interconnected by a web disposed beneath the cross-member, the two flanges being slidably mounted on the opposite faces of the two carriages.

That U-shaped configuration of the cursor-carrier gives rise to mechanical deformation which is harmful for machining accuracy, particularly when the distance between the flanges is designed to make it possible to move the spindle a long way along the X axis without moving the gantry. To remedy that problem, it is necessary to increase the dimensions of the cursor-carrier, thereby increasing its weight, which gives rise to an increase in the inertia of the moving parts, and thus to a decrease in displacement speed.

OBJECT AND SUMMARY OF THE INVENTION

The object of the invention is to propose a novel structure for the gantry and the means for mounting the cursor on the gantry, making it easy to remedy deformation of the cursor-carrier without excessively increasing weight.

The invention achieves its object by said cross-member being constituted by two parallel beams that are spaced apart in the X axis direction, said two beams having facing inside faces, and by said carriages being disposed respectively on said inside faces on either side of said cursor-carrier.

By means of this disposition, the section of the cursor-carrier can have a configuration other than a U-shaped configuration and it can be stiffened without excessively increasing its mass.

Advantageously, the cursor-carrier has two vertical flanges perpendicular to the X axis, extending up from a bottom web, and interconnected by stiffening elements, said two flanges being mounted to slide respectively on the facing faces of said two carriages and being driven synchronously by the numerical control system, and the cursor is mounted to slide on said bottom web.

BRIEF DESCRIPTION OF THE DRAWING

Other advantages and characteristics of the invention will appear on reading the following description given by way of example and with reference to the accompanying drawing, in which.

MORE DETAILED DESCRIPTION

Figure 1:
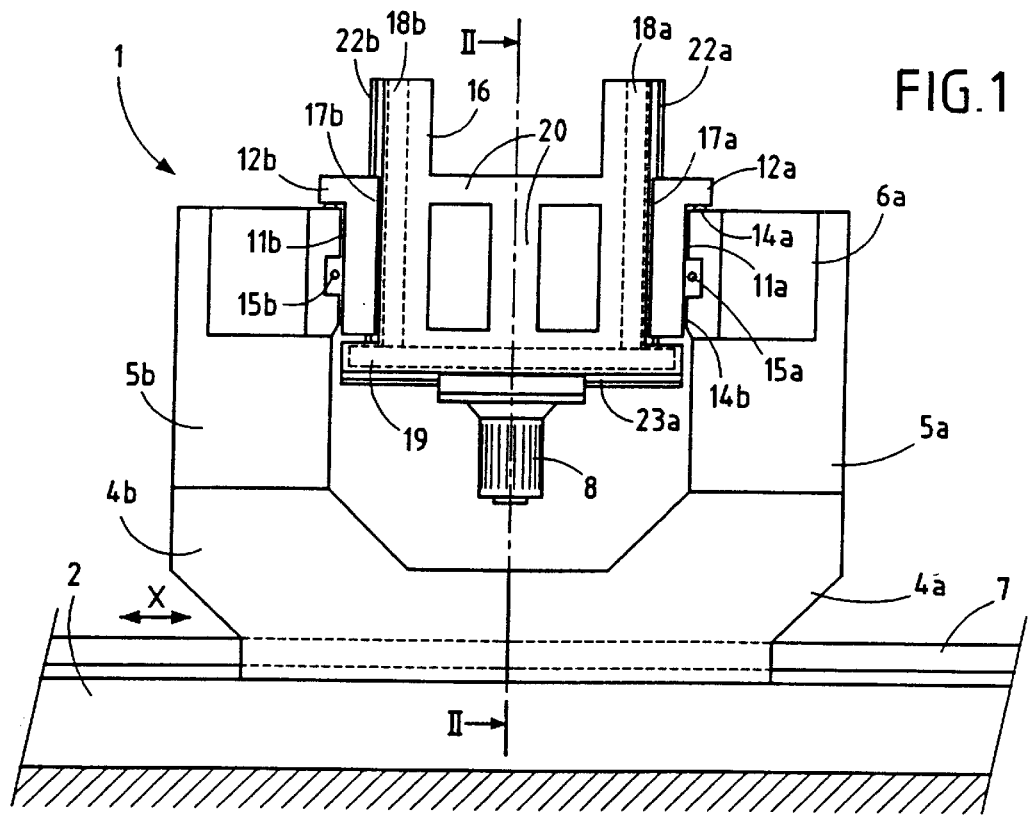
FIG. 1 is a side view of the machine tool of the invention having a moving gantry and a spindle.
Figure 2:
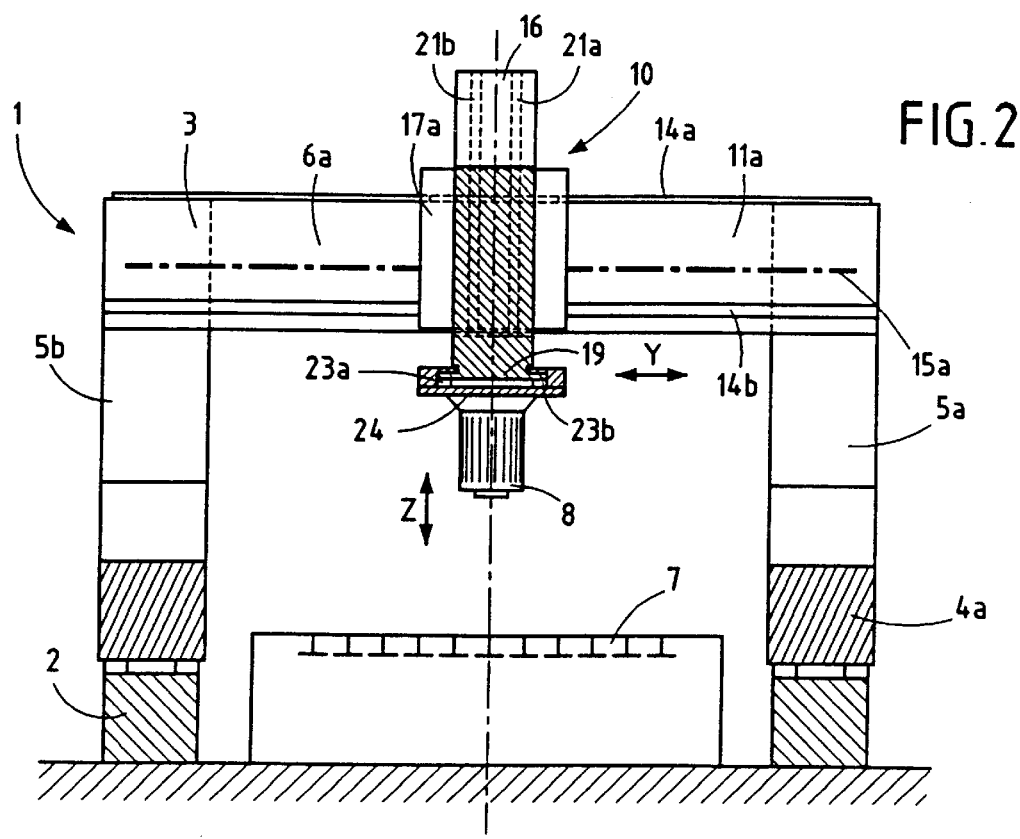
FIG. 2 is a section through the machine tool of the invention, the section being on line II—II of FIG. 1.

In the drawing, reference 1 designates a milling machine having a vertical spindle and a moving gantry. The machine comprises, in conventional manner, a rigid bench 2 on which a gantry 3 is mounted to move along an X axis. The gantry has two vertical uprights 4a, 4b, each terminated at its top by two cradles 5a, 5b that are spaced apart in the X axis direction. The two parallel beams 6a, 6b fixed respectively on the front cradles 5a of the two uprights 4a, 4b, and on the rear cradles 5b of said uprights. The beams 6a, 6b define a transverse Y axis that is perpendicular to the X axis, and together they constitute the top cross-member of the gantry 3. A traditional drive system enables the gantry 3 to be displaced. Reference 7 designates a support table for the part that is to be machined. Reference 8 designates a tool-carrying spindle capable of rotating about a vertical Z axis and mounted on the beams 6a and 6b by mounting means 10 in such a manner that the tool-carrying spindle 8 can move along the axes Y and Z and also to some extent along the X axis without displacing the gantry 3. Displacement of the tool-carrying spindle 8 relative to the gantry 3 along the axes X, Y, and Z is under numerical control (not shown in the drawing).

The beams 6a and 6b have two facing inside faces respectively referenced 11a for the beam 5a and 11b for the beam 6b.

The mounting means 10 comprise two carriages 12a, 12b disposed respectively on the facing faces 11a, 11b of the beams 6a, 6b. These carriages 12a, 12b are mounted to slide by means of slideways 14a, 14b parallel to the Y axis, and they are driven by means of two rigid drive systems 15a, 15b that are accurately synchronized by the numerical control.

The two carriages 12a and 12b drive and guide, in the Y direction, a cursor-carrier 16 disposed between the facing faces 17a, 17b of the carriages 12a, 12b. The cursor-carrier 16 has two vertical flanges 18a, 18b perpendicular to the X axis and extending up from a bottom web 19 disposed beneath the bottom faces of the beams 6a, 6b.

Stiffener elements 20 interconnect the flanges 18a, 18b and also connect them to the middle portion of the bottom web 19. These stiffening elements are constituted by spacers, for example, or by rigid plates. The vertical flanges 18a, 18b are mounted to slide relative to respective facing faces 17a, 17b of the carriages 12a, 12b by means of vertical slideways 21a, 21b that are parallel to the Z axis, and they are driven relative to the carriages 12a, 12b by two rigid drive systems 22a, 22b that are accurately synchronized by the numerical control.

The bottom web 19 of the cursor-carrier 16 carries slideways 23a, 23b that are parallel to the X axis and that guide a cursor 24 on which the tool-carrying spindle 8 is mounted to rotate. Displacement of the cursor 24 relative to the cursor-carrier 16 is controlled by a rigid drive system, of conventional type, controlled by the numerical control system.

The structure of the above-described mounted means 10 makes it possible to move the tool-carrier spindle 8 in a three-dimensional space without having to move the gantry 3. The volume of this space is defined by the maximum displacement along the Y axis of the carriages 12a and 12b, the maximum displacement along the Z axis of the cursor-carrier 16, and the maximum displacement along the X axis of the cursor 24 relative to the cursor-carrier 16. The cursor 24 can be moved on its own along the X axis direction over a considerable distance and with high acceleration because of the low mass of the cursor 24.

In addition, the disposition of the cursor-carrier 16 between the carriages 12a, 12b makes it possible to omit the U-shaped configuration of FR-A-2 715 336. In particular, it can be made extremely rigid while having low mass. This mass saving makes it possible to move the tool over a considerable distance and with high acceleration in the Y axis direction. In addition, the increased stiffness facilitates precision machining.

I claim:

1. A machine tool comprising a rigid bench, a gantry having two uprights interconnected by a top cross-member having two faces spaced apart in the direction of an X axis, means for moving the gantry on said bench along the X axis, two carriages disposed respectively on said spaced-apart faces of the cross-member and movable along a transverse Y axis, a cursor-carrier supported by said carriages and movable along a vertical Z axis, a cursor mounted on said cursor-carrier and movable along the X axis, a tool-carrier spindle carried by said cursor and capable of rotating about the Z axis, and a numerical control system for controlling synchronized movements of the two carriages along the Y axis, movement of said cursor-carrier along the Z axis, and movement of said cursor relative to said cursor-carrier along the X axis, thereby enabling machining to be performed quickly and accurately in a limited three-dimensional zone without moving the gantry, wherein said cross-member is constituted by two parallel beams that are spaced apart in the X axis direction, said two beams having facing inside faces, and wherein said carriages are disposed respectively on said inside faces on either side of said cursor-carrier.

2. A machine tool according to claim 1, wherein the cursor-carrier has two vertical flanges perpendicular to the X axis, extending up from a bottom web, and interconnected by stiffening elements, said two flanges being mounted to slide respectively on the facing faces of said two carriages and being driven synchronously by the numerical control system, and the cursor is mounted to slide on said bottom web.

* * * * *